(12) United States Patent
Hakkani-Tur et al.

(10) Patent No.: US 10,134,389 B2
(45) Date of Patent: Nov. 20, 2018

(54) CLUSTERING USER UTTERANCE INTENTS WITH SEMANTIC PARSING

(71) Applicant: Microsoft Technology Licensing, LLC, Redmond, WA (US)

(72) Inventors: Dilek Hakkani-Tur, Kirkland, WA (US); Yun-Cheng Ju, Bellevue, WA (US); Geoffrey G. Zweig, Sammamish, WA (US); Gokhan Tur, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 270 days.

(21) Appl. No.: 14/846,486

(22) Filed: Sep. 4, 2015

(65) Prior Publication Data

US 2017/0069310 A1 Mar. 9, 2017

(51) Int. Cl.
*G10L 15/06* (2013.01)
*G10L 15/18* (2013.01)
*G06F 17/27* (2006.01)

(52) U.S. Cl.
CPC ........ *G10L 15/063* (2013.01); *G06F 17/2705* (2013.01); *G06F 17/2785* (2013.01); *G10L 15/1815* (2013.01); *G10L 15/1822* (2013.01); *G10L 2015/0631* (2013.01)

(58) Field of Classification Search
CPC .................................................. G06F 17/2785
USPC ........................................................ 704/4, 9
See application file for complete search history.

(56) References Cited

U.S. PATENT DOCUMENTS 5,835,893 A * 11/1998 Ushioda .................. G10L 15/18
704/10
5,930,746 A 7/1999 Ting
6,282,507 B1 * 8/2001 Horiguchi ............. G06F 17/271
345/171

(Continued)

OTHER PUBLICATIONS

Baker, et al., "The Berkeley FrameNet Project", Proceedings of the 36th Annual Meeting of the Association for Computational Linguistics (ACL) and 17th International Conference on Computational Linguistics, Aug. 10, 1998, pp. 86-90, vol. 1, ACL.

(Continued)

*Primary Examiner* — Michael N Opsasnick
(74) *Attorney, Agent, or Firm* — Alleman Hall Creasman & Tuttle LLP (57) ABSTRACT

A system is provided that trains a spoken language understanding (SLU) classifier. A corpus of user utterances is received. For each of the user utterances in the corpus, the user utterance is semantically parsed, and the result of this semantic parsing is represented as a rooted semantic parse graph. The parse graphs representing all of the user utterances in the corpus are then combined into a single corpus graph that represents the semantic parses of the entire corpus. The user utterances in the corpus are then clustered into intent-wise homogeneous groups of user utterances, where this clustering includes finding subgraphs in the corpus graph that represent different groups of user utterances, and each of these different groups has a similar user intent. The intent-wise homogeneous groups of user utterances are then used to train the SLU classifier, and the trained SLU classifier is output.

20 Claims, 4 Drawing Sheets

(56) References Cited

U.S. PATENT DOCUMENTS

| | | | |
|---|---|---|---|
| 6,782,357 | B1 | 8/2004 | Goodman et al. |
| 7,742,911 | B2 | 6/2010 | Chotimongkol et al. |
| 7,805,302 | B2 | 9/2010 | Chelba et al. |
| 8,335,683 | B2 | 12/2012 | Acero et al. |
| 8,548,805 | B2 | 10/2013 | Chotimongkol et al. |
| 8,676,565 | B2 | 3/2014 | Larcheveque et al. |
| 8,706,503 | B2 | 4/2014 | Cheyer et al. |
| 2001/0044719 | A1* | 11/2001 | Casey ............... G10L 15/02 704/245 |
| 2002/0198713 | A1* | 12/2002 | Franz ............... G10L 15/26 704/252 |
| 2004/0111255 | A1* | 6/2004 | Huerta ............... G06F 17/278 704/10 |
| 2004/0148170 | A1* | 7/2004 | Acero ............... G06F 17/2715 704/257 |
| 2005/0065777 | A1* | 3/2005 | Dolan ............... G06F 17/30684 704/10 |
| 2011/0238409 | A1* | 9/2011 | Larcheveque ...... G06F 17/2785 704/9 |
| 2012/0290290 | A1 | 11/2012 | Tur et al. |
| 2014/0025705 | A1 | 1/2014 | Barve et al. |
| 2014/0236570 | A1 | 8/2014 | Heck et al. |
| 2014/0236575 | A1 | 8/2014 | Tur et al. |

OTHER PUBLICATIONS

Banarescu, et al., "Abstract Meaning Representation for Sembanking", Proceedings of the 7th Linguistic Annotation Workshop & Interoperability with Discourse, Aug. 8-9, 2013, pp. 178-186, Association for Computational Linguistics.

Chen, et al., "Jointly Modeling Inter-Slot Relations by RandomWalk on Knowledge Graphs for Unsupervised Spoken Language Understanding", Human Language Technologies: The 2015 Annual Conference of the North American Chapter of the Association for Computational Linguistics (ACL), May 31-Jun. 5, 2015, pp. 619-629, ACL.

Chen, "Unsupervised Spoken Language Understanding in Dialogue Systems", Jan. 16, 2015, pp. 1-56, Carnegie Mellon University, retrieved at <<www.cs.cmu.edu/~yvchen/doc/NCTU15_slide.pdf>>.

Chen, et al., "Unsupervised Induction and Filling of Semantic Slots for Spoken Dialogue Systems Using Frame-Semantic Parsing", 2013 Institute of Electrical and Electronics Engineers (IEEE) Workshop on Automatic Speech Recognition and Understanding (ASRU 2013), Dec. 8-12, 2013, pp. 120-125, IEEE.

Chotimongkol, et al., "Automatic Concept Identification in Goal-Oriented Conversations", 7th International Conference on Spoken Language Processing (ICSLP2002—Interspeech 2002), Sep. 16-20, 2002, pp. 5, Carnegie Mellon University.

Das, et al., "Probabilistic Frame-Semantic Parsing", Human Language Technologies: The 2010 Annual Conference of the North American Chapter of the Association for Computational Linguistics (ACL), Jun. 2010, pp. 948-956, ACL.

Favre, B., D. Hakkani-Tur, S. Cuendet, Icsiboost, http://code.google.com/p/icsiboost, retrieved Jul. 31, 2015, pp. 1.

Frey, et al., "Clustering by Passing Messages Between Data Points", Science, Feb. 16, 2007, pp. 972-976, vol. 315, American Association for the Advancement of Science.

Gao, et al., "Improving Language Model Size Reduction using Better Pruning Criteria", Proceedings of the 40th Annual Meeting of the Association for Computational Linguistics (ACL), Jul. 2002, pp. 176-182, ACL.

Guo, et al., "Joint Semantic Utterance Classification and Slot Filling With Recursive Neural Networks", Institute of Electrical and Electronics Engineers (IEEE) Spoken Language Technology Workshop (SLT) 2014, Dec. 7-10, 2014, pp. 554-559, IEEE.

Hakkani-Tur, et al., "AWeakly-Supervised Approach for Discovering New User Intents from Search Query Logs", Proceedings of Interspeech 2013, Aug. 25-29, 2013, pp. 3780-3784, International Speech Communication Association (ISCA).

Kingsbury, et al., "Adding Semantic Annotation to the Penn TreeBank", Proceedings of the Human Language Technology Conference, Mar. 24-27, 2002, pp. 5, Morgan Kaufmann Publishers.

Lee, et al., "Unsupervised Spoken Language Understanding for a Multi-Domain Dialog System ", Institute of Electrical and Electronics Engineers (IEEE) Transactions on Audio, Speech, and Language Processing, Aug. 29, 2013, pp. 2451-2464, vol. 21, Issue 11, IEEE.

Lin, et al., "Active Objects: Actions for Entity-Centric Search", Proceedings of the 21st international conference on World Wide Web (WWW '12), Apr. 16-20, 2012, pp. 10, Association for Computing Machinery (ACM).

Liu, et al., "Clustering Through Decision Tree Construction", Proceedings of the ninth international Conference on Information and Knowledge Management (CIKM 2000), Nov. 6, 2000, pp. 20-29, Association for Computing Machinery (ACM).

Meng, et al., "Semiautomatic Acquisition of Semantic Structures for Understanding Domain-Specific Natural Language Queries", Institute of Electrical and Electronics Engineers (IEEE) Transactions on Knowledge and Data, Engineering, Jan./Feb. 2002, pp. 172-181, vol. 14, No. 1, IEEE.

Pradhan, et al., "Semantic Role Labeling Using Different Syntactic Views", Proceedings of the 43rd Annual Meeting of the Association for Computational Linguistics (ACL), Jun. 2005, pp. 581-588, ACL.

Tang, et al., "Active Learning for Statistical Natural Language Parsing", Proceedings of the 40th Annual Meeting of the Association for Computational Linguistics (ACL), Jul. 2002, pp. 120-127, ACL.

Tur, et al., "Detecting Out-Of-Domain Utterances Addressed to a Virtual Personal Assistant", Proceedings of Interspeech 2014, Sep. 14-18, 2014, pp. 283-287, International Speech Communication Association (ISCA).

Tur, et al., "Semi-Supervised Learning for Spoken Language Understanding Using Semantic Role Labeling", 2005 Institute of Electrical and Electronics Engineers (IEEE) Workshop on Automatic Speech Recognition and Understanding (ASRU 2005), Nov. 27, 2005, pp. 232-237, IEEE.

Vanderwende, "NLPwin—an introduction", Microsoft Research TechReport MSR-TR-2015-23, Mar. 2015, pp. 20, Microsoft Research.

\* cited by examiner

CLUSTERING USER UTTERANCE INTENTS WITH SEMANTIC PARSING

BACKGROUND

Spoken language understanding (SLU) is an emerging field that resides in-between the fields of speech processing and natural language processing. SLU has a vast array of applications in both the areas of natural human-to-machine communication and human-to-human communication. Examples of such applications include various enterprise applications (e.g., automated customer-care centers and meeting summarization) and various consumer applications (e.g., speech summarization, voice search, spoken document retrieval, and more complex voice interaction with mobile and other types of computing devices, automobiles, robots, and smart home environments). Simply put, SLU in today's human-to-machine spoken dialog systems aims to extract "meaning" from conversational speech. In other words, SLU in today's human-to-machine spoken dialog systems generally attempts to obtain a conceptual representation (e.g., an understanding of the meaning) of naturally spoken language by leveraging various technologies such as signal processing, pattern recognition, machine learning, and artificial intelligence.

SUMMARY

Utterance intent clustering technique implementations described herein generally involve a system for training a spoken language understanding (SLU) classifier. In one exemplary implementation a corpus of user utterances is received. Then, for each of the user utterances in the corpus, the user utterance is semantically parsed, and the result of this semantic parsing is represented as a rooted semantic parse graph. The parse graphs representing all of the user utterances in the corpus are then combined into a single corpus graph that represents the semantic parses of the entire corpus and includes a root node that is common to the parse graph representing each of the user utterances in the corpus. The user utterances in the corpus are then clustered into intent-wise homogeneous groups of user utterances, where this clustering includes finding subgraphs in the corpus graph that represent different groups of user utterances, each of these different groups has a similar user intent, and each of the subgraphs is more specific than the root node alone and more general than the full semantic parses of the individual user utterances. The intent-wise homogeneous groups of user utterances are then used to train the SLU classifier, and the trained SLU classifier is output.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the utterance intent clustering technique implementations described herein will become better understood with regard to the following description, appended claims, and accompanying drawings where:

DETAILED DESCRIPTION

In the following description of utterance intent clustering technique implementations (hereafter simply referred to as clustering technique implementations) reference is made to the accompanying drawings which form a part hereof, and in which are shown, by way of illustration, specific implementations in which the clustering technique can be practiced. It is understood that other implementations can be utilized and structural changes can be made without departing from the scope of the clustering technique implementations.

It is also noted that for the sake of clarity specific terminology will be resorted to in describing the clustering technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the clustering technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the clustering technique does not inherently indicate any particular order nor imply any limitations of the clustering technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Spoken Language Understanding (SLU) Systems

As is appreciated in the art of human-to-machine spoken dialog systems (also known as conversational interaction systems and conversational understanding systems, and hereafter simply referred to as spoken dialog systems) and as described heretofore, spoken language understanding (SLU) in today's spoken dialog systems generally attempts to obtain a conceptual representation (e.g., an understanding of the meaning) of naturally spoken language. More particularly, SLU aims to identify the domain and intent of a user as expressed in their naturally spoken sentences and phrases (herein simply referred to as user utterances). Conventional spoken dialog applications have a pre-determined set of domains and user intents that are manually designed by domain experts. Examples of such pre-determined domains include restaurants, hotels, music, games, movies, weather, communication, and calendar, among others.

The domain that corresponds to a given user utterance (also known as the user-requested domain) may be determined using various conventional methods. For example, the user-requested domain may be determined using a conventional "acceptance" method where each pre-determined domain decides whether or not the user utterance belongs to that domain. The user-requested domain may also be determined using a conventional "triage" method where a top-level classifier decides on the domain of the user utterance. User utterances that do not belong to any of the domains in the pre-determined set of domains of a given spoken dialog system or application are herein referred to as uncovered, out-of-domain user utterances; such user utterances are also sometimes referred to as orphan user utterances.

As will be appreciated from the more detailed description that follows, the clustering technique implementations described herein may be utilized to determine (e.g., discover) user intents and associated arguments in any user utterance, regardless of whether or not it belongs to any of the domains in the pre-determined set of domains. The clustering technique implementations may also be utilized to determine user intents and associated arguments in just uncovered, out-of-domain user utterances. In other words, the clustering technique implementations may be used to determine user intents and associated arguments that are not currently covered by conventional spoken dialog systems and applications.

As is also appreciated in the art of spoken dialog systems, conventional spoken dialog applications (including multi-domain personal agent/assistant applications such as SIRI® (a registered service mark of Apple Inc.) and CORTANA® (a registered trademark of Microsoft Corporation), among others) usually direct uncovered, out-of-domain user utterances to a conventional text-based web search engine. As is appreciated in the art of the World Wide Web (herein simply referred to as the web), web search engines are not necessarily developed with the aim of responding to search requests containing such user utterances, except with limited support on instant answers to mainly factoid questions. As such, in most cases the uncovered, out-of-domain user utterances will remain unhandled (e.g., unfulfilled by the web search engine).

2.0 Clustering User Utterance Intents with Semantic Parsing

The clustering technique implementations described herein are generally applicable to the task of determining (e.g., inferring) user intents in user utterances that are input to a given spoken dialog system or application. More particularly and by way of example but not limitation, the clustering technique implementations may be used to train an SLU classifier which may then be used to determine the intent of a user from a particular utterance that is input by the user to the spoken dialog system or application.

The clustering technique implementations described herein are advantageous for various reasons including, but not limited to, the following. The clustering technique implementations are applicable to any domain. Since the clustering technique implementations can be utilized to accurately determine user intents and associated arguments in uncovered, out-of-domain user utterances, the clustering technique implementations can be used to aid in future phases of spoken dialog system coverage design. More particularly, the clustering technique implementations can be used to aid in bootstrapping spoken dialog applications and unsupervised statistical SLU classifiers for these new domains and user intents. For example, tested implementations of the clustering technique have shown that a statistical SLU classifier which is trained using the semantic clusters of user utterances that are formed by the clustering technique implementations results in a significantly higher classification F-measure compared to alternative conventional clustering methods such as k-means clustering and affinity propagation, among others. The clustering technique implementations can thus be used to extend the coverage of spoken dialog applications to new uncovered domains and user intents, thus increasing the accuracy of SLU in these applications.

As will be appreciated from the more detailed description that follows, the clustering technique implementations described herein also eliminate the need for spoken dialog system and application developers to have to manually analyze a corpus of example user utterances, manually detect user utterances in this corpus that have the same user intent, then design an annotation schema that describes these user intents and associated arguments with examples, and then manually annotate the example user utterances in the corpus according to this annotation schema. The clustering technique implementations also eliminate the need for the system and application developers to have to repeat the just-described manual steps when users have new intents that are not currently covered by the annotated examples. The clustering technique implementations also eliminate the need to rely on web page click information, which may not be available in the context of a given spoken dialog application. The clustering technique implementations also increase the granularity of user intents that can be determined in user utterances, thus further increasing the accuracy of SLU in spoken dialog applications.

Additionally, rather than treating each user utterance as a conventional bag of words where all words in the utterance are treated equally and different senses (e.g., meanings) of a given word are treated similarly, the clustering technique implementations described herein consider the semantic intent, and the syntactic and semantic structure, of the words in each user utterance. In other words, the clustering technique implementations are focused on semantic units instead of individual words. For example, consider the following three user utterances:

UTTERANCE 1: "play hotel california",
UTTERANCE 2: "book a hotel in saratoga california", and
UTTERANCE 3: "find a book about haunted hotels in california"

It is noted that most of the non-stop words in UTTERANCES 1, 2 and 3 are shared between these utterances (as indicated by the underlined words in these utterances). However, rather than grouping UTTERANCES 1, 2 and 3 into the same cluster, since the clustering technique implementations described herein consider the lexical semantic structure of each user utterance and the semantic intents (along with the syntactic and semantic structures) of UTTERANCES 1, 2 and 3 are very different (i.e., the semantic intent of UTTERANCE 1 is playing a song, the semantic intent of UTTERANCE 2 is booking a hotel room, and the semantic intent of UTTERANCE 3 is finding a book), the clustering technique implementations will group UTTERANCE 1 into one cluster, UTTERANCE 2 into another cluster, and UTTERANCE 3 into yet another cluster.

It is noted that the clustering technique implementations described herein can be realized in various ways. By way of example but not limitation, the clustering technique implementations can be integrated directly into a given spoken dialog application or web search application, among other types of applications. The clustering technique implementations can also be realized as a cloud service. The term "cloud service" is used herein to refer to a web application that operates in the cloud, and can be hosted on (e.g., deployed at) one or more computing devices which may be located in different geographic regions (e.g., different regions of the world), and can be concurrently utilized by a plurality of remote client computing devices each of which is voice-enabled and executes one or more spoken dialog applications.

Figure 1:
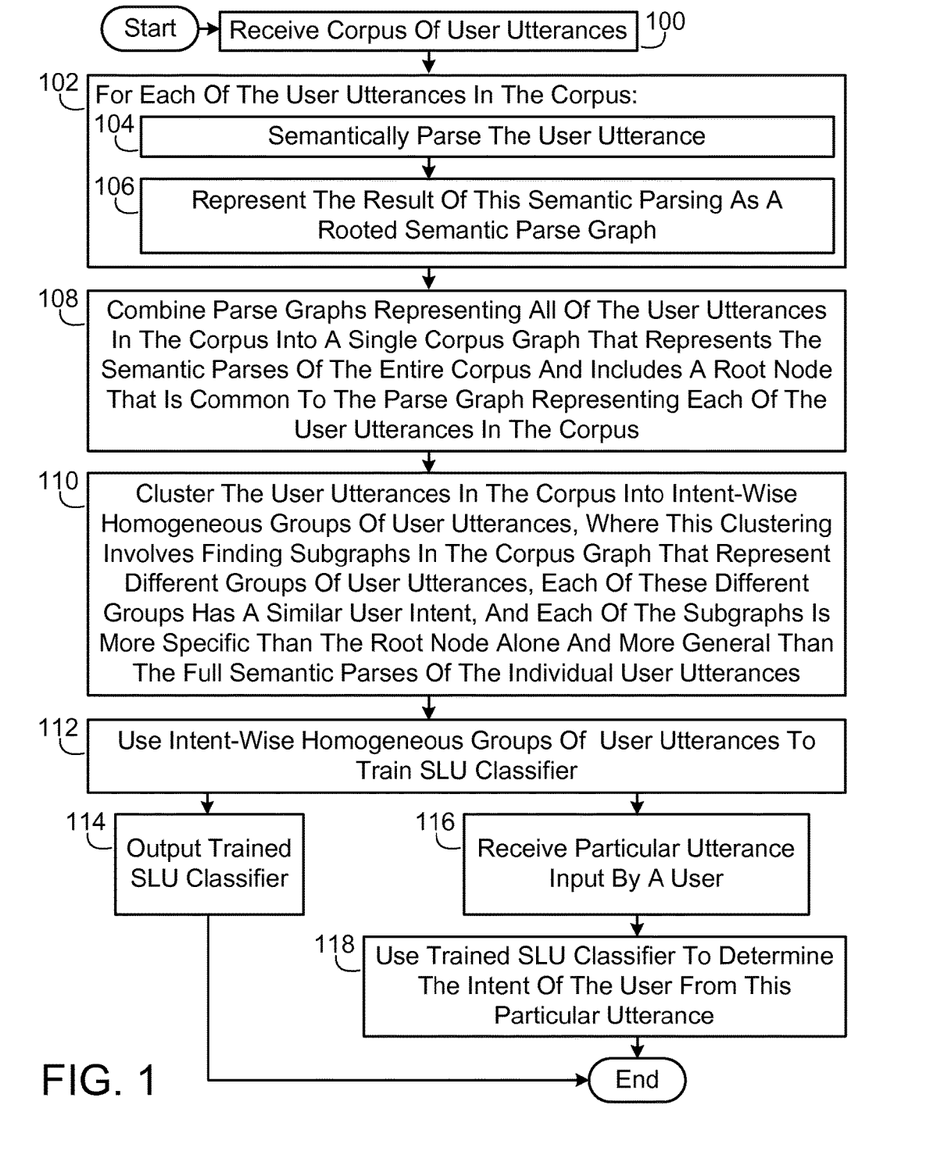
FIG. 1 is a flow diagram illustrating an exemplary implementation, in simplified form, of a process for training a spoken language understanding (SLU) classifier and then using it to determine user intents in user utterances that are input to a given spoken dialog system or application.

FIG. 1 illustrates an exemplary implementation, in simplified form, of a process for training an SLU classifier and then using it to determine (e.g., infer) user intents in user utterances that are input to a given spoken dialog system or application. In other words, a portion of the process illustrated in FIG. 1 learns an SLU classifier that is capable of determining user intents in user utterances. It is noted that the clustering technique implementations described herein can perform this SLU classifier training/learning using any semi-supervised or unsupervised machine learning method such as a conventional logistic regression method, or a conventional decision trees method, or a conventional support vector machine method, among other types of machine learning methods. It is also noted that the clustering technique implementations exemplified in a portion of FIG. 1 can be used to train a variety of SLU classifiers including a conventional support vector machine, or a conventional artificial neural network, or a conventional Bayesian statistical classifier, among other types of classifiers.

As exemplified in FIG. 1, the process starts with receiving a corpus of user utterances (process action 100). In one implementation of the clustering technique described herein the corpus includes user utterances that are targeted to a specific domain. In another implementation of the clustering technique the corpus includes user utterances that are targeted to a plurality of different domains. After the corpus of user utterances has been received (action 100), the following actions take place for each of the user utterances in the corpus (process action 102). The user utterance is first semantically parsed (process action 104), and then the result of this semantic parsing is represented as a rooted semantic parse graph (also known as a rooted semantic parse tree) (process action 106).

The clustering technique implementations described herein can use any type of semantic parser to perform the just-described semantic parsing of each of the user utterances in the corpus. By way of example but not limitation, in a tested implementation of the clustering technique this semantic parsing is performed using a conventional Abstract Meaning Representation (AMR) semantic parser (such as the NLPwin parser, among other types of AMR-style parsers) that considers the lexical semantic structure of each of the user utterances. Usage of this particular parser is advantageous in that it is more robust and more directly trainable than other types of semantic parsers. In another implementation of the clustering technique described herein the semantic parsing of each of the user utterances in the corpus is performed using a conventional Proposition Bank (also known as PropBank) semantic parser. In yet another implementation of the clustering technique described herein the semantic parsing of each of the user utterances in the corpus is performed using a conventional dependency parser. In yet another implementation of the clustering technique described herein the semantic parsing of each of the user utterances in the corpus is performed using a conventional FrameNet semantic parser. In yet another implementation of the clustering technique described herein the semantic parsing of each of the user utterances in the corpus is performed using the dependency parser combined with the FrameNet semantic parser.

The following is an exemplary semantic parse of the user utterance "tell me a funny joke":

---

UTTERANCE 4: "tell me a funny joke"
  (t / tell
      :ARG0 (y / you)
      :ARG1 (j / joke
         :mod (f/ funny))
      :ARG2 (i / I)
      :mode imperative)

---

:mode denotes the dialog act of UTTERANCE 4. Other exemplary types of dialog acts include interrogative and exclamation. :ARG0 denotes the subject of UTTERANCE 4. :ARG1 denotes the direct object of UTTERANCE 4. :ARG2 denotes the indirect object of UTTERANCE 4 according to the conventional PropBank role sets. :mod denotes the modifier employed in UTTERANCE 4.

Figure 2:
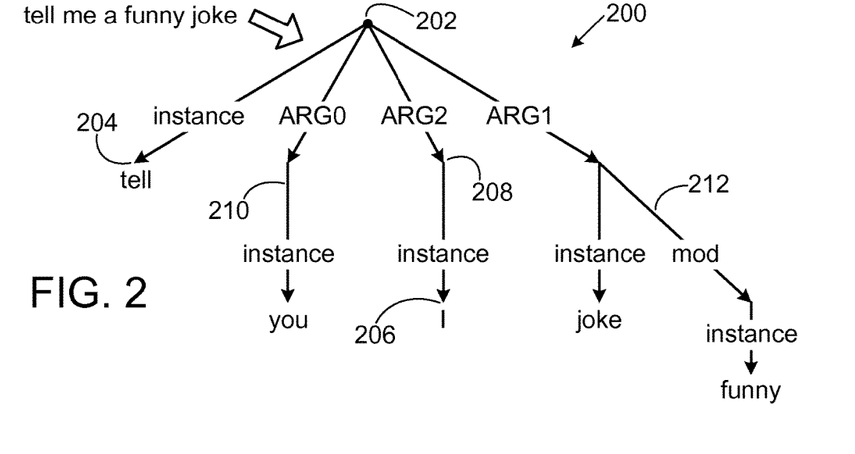
FIG. 2 is a diagram illustrating an exemplary implementation, in simplified form, of a semantic parse graph representing the semantic parse of the user utterance "tell me a funny joke."

FIG. 2 illustrates an exemplary implementation, in simplified form, of a semantic parse graph representing the semantic parse of UTTERANCE 4, where the aforementioned: mode is excluded from the graph for simplicity. As exemplified in FIG. 2, the semantic parse graph 200 is a rooted, directed graph (e.g., tree) having nodes (also known as vertices) that include a root node 202 and a plurality of child nodes (e.g., child nodes 204, 206 and 208), and also having a plurality of directed edges (also known as paths) (e.g., directed edges 210 and 212) each of which either connects the root node 202 to one of the child nodes, or connects one of the child nodes to another one of the child nodes. The graph 200 has labels representing relations on each of its edges, and labels representing concepts on each of the child nodes that terminates a given path from the root node (e.g., child nodes 204 and 206). The instance edges in the graph 200 illustrate the lemma form of the words in UTTERANCE 4.

Referring again to FIG. 1, after each of the user utterances in the corpus has been semantically parsed and the result of this parsing has been represented as a rooted semantic parse graph (action 102), the parse graphs representing all of the user utterances in the corpus are combined into a single corpus graph that represents the semantic parses of the entire corpus, where this corpus graph has a root node that is common to the parse graph representing each of the user utterances in the corpus (process action 108). It is noted that as one traverses the corpus graph starting from its root node, the number of user utterances that share the subgraph from the root node to the current node in their semantic parses gets smaller. For example, consider the corpus graph for the user utterances "tell me a funny joke", "call mom", and "call the florist". An exemplary semantic parse of the first of these utterances is presented above. The following are exemplary semantic parses of the second and third of these utterances, where the :mode is excluded for simplicity:

---
UTTERANCE 5: "call mom"
   (c / call
      :ARG0 (y / you)
      :ARG1 (m / mom)
UTTERANCE 6: "call the florist"
   (c / call
      :ARG0 (y / you)
      :ARG1 (f / florist)
---

While UTTERANCES 4, 5 and 6 share a common root node in the corpus graph, just UTTERANCES 5 and 6 have "call" as a predicate in their semantic parses. As is appreciated in the art of SLU, user intents as stated by user utterances are significantly correlated with the predicates and arguments in the user utterances.

The more detailed description that follows will use the following notation. Let G=(V,E) denote the single corpus graph that represents the semantic parses of the entire corpus of user utterances, where $v_j \in V$ denotes a given node in G and $e_i \in E$ denotes a given directed edge in G. The corpus graph G includes two types of edges $e_i$, namely edges for arguments A and edges for instances I (hereafter sometimes referred to as instance edges). Accordingly, $E = A \cup I$. Let $i_k \in I$ denote a given instance edge in G.

Figure 3:
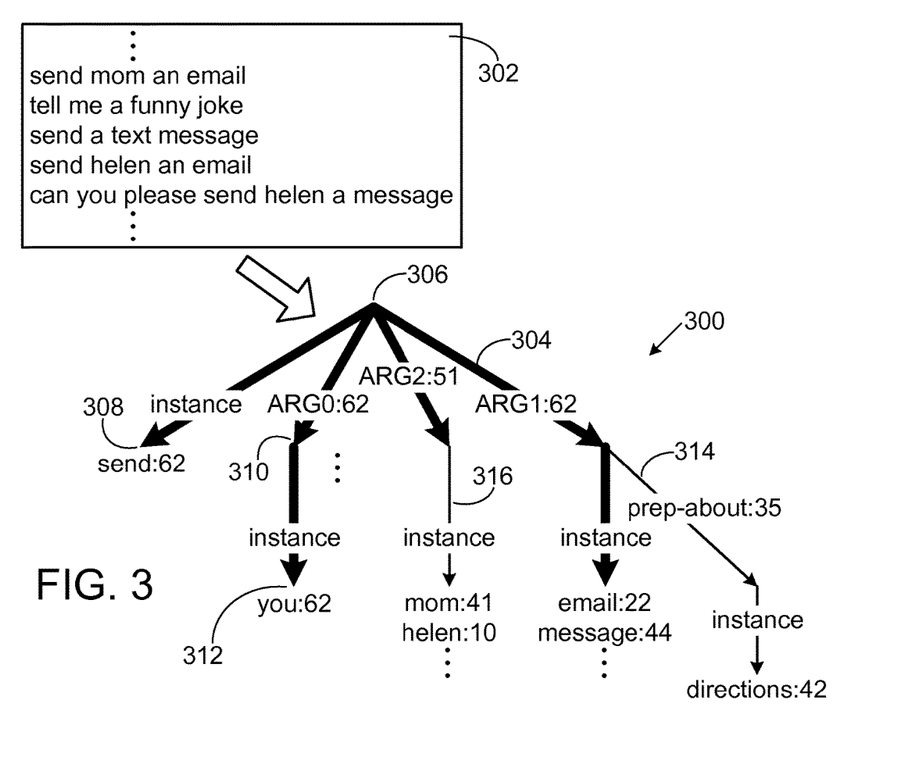
FIG. 3 is a diagram illustrating an exemplary implementation, in simplified form, of a portion of a single corpus graph that represents the semantic parses of a given corpus of user utterances.

FIG. 3 illustrates an exemplary implementation, in simplified form, of a portion of a single corpus graph that represents the semantic parses of a given corpus of user utterances. As exemplified in FIG. 3, the corpus graph portion 300 represents the semantic parses of a corpus of user utterances 302 that includes the user utterances "send mom an email", "send a text message", "send helen an email", and "can you please send helen a message", among other user utterances. The graph 300 is a rooted, directed graph that is generally structured as follows. The graph 300 has nodes that include a root node 306 that is common to the parse graph representing each of the user utterances in the corpus 302, and a plurality of child nodes (e.g., child nodes 308, 310 and 312). The graph 300 also has a plurality of directed edges (e.g., directed edges 314 and 316) each of which either connects the root node 306 to one of the child nodes, or connects one of the child nodes to another one of the child nodes. Each of the edges in the graph 300 is labeled with a relation and, except for the instance relation, a count of the number of times this particular relation appears in the corpus 302. Each of the child nodes in the graph 300 that terminates a given path from the root node (e.g., child nodes 308 and 312) is labeled with a concept and a count of the number of times this particular concept appears in the corpus. In other words, the single corpus graph 300 represents the semantic parses of the entire corpus 302 according to the predicates and arguments of each of the user utterances in the corpus.

Referring again to FIG. 1, after the parse graphs representing all of the user utterances in the corpus have been combined into a single corpus graph (action 108), the user utterances in the corpus are clustered into intent-wise homogeneous groups of user utterances, where this clustering involves finding subgraphs in the corpus graph that represent different groups of user utterances, each of these different groups has a similar (e.g., common) user intent, and each of the subgraphs is more specific than the root node alone and more general than the full semantic parses of the individual user utterances (process action 110). This action of clustering the user utterances in the corpus into intent-wise homogeneous groups of user utterances (action 110) is hereafter simply referred to as the utterance clustering action. As will be described in more detail hereafter, the just-described subgraphs may be found using various different pruning methods each of which prunes the corpus graph in a certain manner. As such, the utterance clustering action groups each of the user utterances in the corpus that include the pruned part of the corpus graph in the user utterance's semantic parse into an intent cluster.

Referring again to FIG. 1, once the utterance clustering action (action 110) has been completed the resulting intent-wise homogeneous groups of user utterances can be used to train the aforementioned SLU classifier (process action 112). In one implementation of the clustering technique described herein the trained SLU classifier is output (process action 114). In another implementation of the clustering technique a particular utterance that is input by a user to a given spoken dialog system or application is received (process action 116), and the trained SLU classifier is then used to determine the intent of the user from this particular utterance (process action 118).

Referring again to FIG. 3, the six bolded edges therein indicate a given subgraph 304 in the corpus graph portion 300 that remains after a given pruning thereof. The subgraph 304 represents a given intent-wise homogeneous group of user utterances from the corpus 302, where the semantic parse of each of the user utterances in this homogeneous group has the semantic pattern represented by the subgraph 304. Accordingly, each of the user utterances in the intent-wise homogeneous group of user utterances that is represented by the subgraph 304 has a similar user intent, that being to send an item of information such as an email or a text message.

Referring again to FIG. 1, the aforementioned utterance clustering action (action 110) can be performed using a variety of methods examples of which will now be described in more detail. In one implementation of the clustering technique described herein the utterance clustering action is performed using a frequency-based corpus graph pruning method that operates as follows. The frequency of occurrence of each of the child nodes in the corpus graph is first computed, where the aforementioned counts that are included in the edge labels and child node labels are used in this computation. The child nodes in the corpus graph whose frequency of occurrence is less than a prescribed frequency threshold are then identified. The corpus graph is then pruned by eliminating these identified child nodes and the edges connected thereto from the corpus graph. In other words, the frequency-based corpus graph pruning method prunes the corpus graph by cutting infrequent nodes and edges. In a tested implementation of the frequency-based corpus graph pruning method a value for the frequency threshold was selected which optimizes the performance (e.g., the intent determination accuracy) of the clustering technique implementations based on empirical testing of these implementations using a plurality of different development corpora.

In another implementation of the clustering technique described herein the utterance clustering action is performed using an entropy-based corpus graph pruning method that operates as follows. The entropy at each of the child nodes in the corpus graph is first computed; an exemplary method for performing this entropy computation is described in more detail hereafter. The child nodes in the corpus graph whose entropy is greater than a prescribed entropy threshold are then identified. The corpus graph is then pruned by eliminating these identified child nodes and the edges connected thereto from the corpus graph. In other words, the entropy-based corpus graph pruning method prunes the corpus graph by cutting high entropy nodes and edges. In one implementation of the entropy-based corpus graph pruning method this pruning is performed via a breadth-first (e.g., left-to-right) traversal of the corpus graph. In another implementation of the entropy-based corpus graph pruning method this pruning is performed via a depth-first (e.g., top-to-bottom) traversal of the corpus graph. In a tested implementation of the entropy-based corpus graph pruning method a value for the entropy threshold was selected which optimizes the performance of the clustering technique implementations based on empirical testing of these implementations using a plurality of different development corpora.

In yet another implementation of the clustering technique described herein the utterance clustering action is performed by first executing the frequency-based corpus graph pruning method and then executing the entropy-based corpus graph pruning method. More particularly, the frequency of occurrence of each of the child nodes in the corpus graph is first computed. The child nodes in the corpus graph whose frequency of occurrence is less than the prescribed frequency threshold are then initially identified. The corpus graph is then initially pruned by eliminating these initially identified child nodes and the edges connected thereto from the corpus graph. The entropy at each of the child nodes in the initially pruned corpus graph is then computed. The child nodes in the initially pruned corpus graph whose entropy is greater than the prescribed entropy threshold are subsequently identified. The initially pruned corpus graph is subsequently pruned by eliminating these subsequently identified child nodes and the edges connected thereto from the initially pruned corpus graph.

In yet another implementation of the clustering technique described herein the utterance clustering action is performed by first executing the entropy-based corpus graph pruning method and then executing the frequency-based corpus graph pruning method. More particularly, the entropy at each of the child nodes in the corpus graph is first computed. The child nodes in the corpus graph whose entropy is greater than the prescribed entropy threshold are then initially identified. The corpus graph is then initially pruned by eliminating these initially identified child nodes and the edges connected thereto from the corpus graph. The frequency of occurrence of each of the child nodes in the initially pruned corpus graph is then computed. The child nodes in the initially pruned corpus graph whose frequency of occurrence is less than the prescribed frequency threshold are subsequently identified. The initially pruned corpus graph is subsequently pruned by eliminating the subsequently identified child nodes and the edges connected thereto from the initially pruned corpus graph.

The following is a more detailed description of an exemplary method for computing the entropy at each of the child nodes in the corpus graph. For each of the instance edges $i_k \in I$ in G let $\mathcal{V}_k^m \in V_k$ denote the set of child nodes that carry the possible values of $i_k$, where m=1, ..., $M_k$ is the number of possible values for $i_k$ in G. For example, if the corpus of user utterances includes just two user utterances, namely, "call mom" and "call dad", $M_k$ for the instances of the :ARG1 edge would be 2, and $M_k$ for the instances of the :ARG0 edge would be 1. The main criterion for pruning G is the entropy of each of the instance edges $i_k$, which is denoted as H($\mathcal{V}_k$) and is given by the following equation:

$$H(v_k) = -\sum_{m=1}^{M_k} p(v_k^m) \log p(v_k^m).$$

At each child node the instance edge $i_k$ is pruned if H($\mathcal{V}_k$)>θ, where θ denotes the prescribed entropy threshold.

In yet another implementation of the clustering technique described herein the utterance clustering action is performed using a similarity-based corpus graph pruning method that operates as follows. The semantic similarity of each of the child nodes in the corpus graph to all of the other child nodes in the corpus graph is first computed. The child nodes in the corpus graph whose semantic similarity is less than a prescribed similarity threshold are then identified. The corpus graph is then pruned by eliminating the identified child nodes and the edges connected thereto from the corpus graph. In a tested implementation of the similarity-based corpus graph pruning method a value for the similarity threshold was selected which optimizes the performance of the clustering technique implementations based on empirical testing of these implementations using a plurality of different development corpora.

Given the foregoing, it will be appreciated that the clustering technique implementations described herein can accurately identify the target frame and associated slots that represent a user's intent in user utterances that have no predicates (e.g., verbs)—one example of such a user utterance is "account balance." As is appreciated in the art of SLU, slots are also referred to as arguments, and the target frame and associated slots are also referred to as a target semantic template. The clustering technique implementations can also accurately identify the target frame and associated slots that represent a user's intent in user utterances that include nominal phrases (e.g., a prepositional phrase attached to a noun phrase, among other types of nominal phrases).

It is noted that the foregoing process actions are realized on a computing device such as that described in more detail in the Exemplary Operating Environments section which follows.

2.1 System Framework

Figure 4:
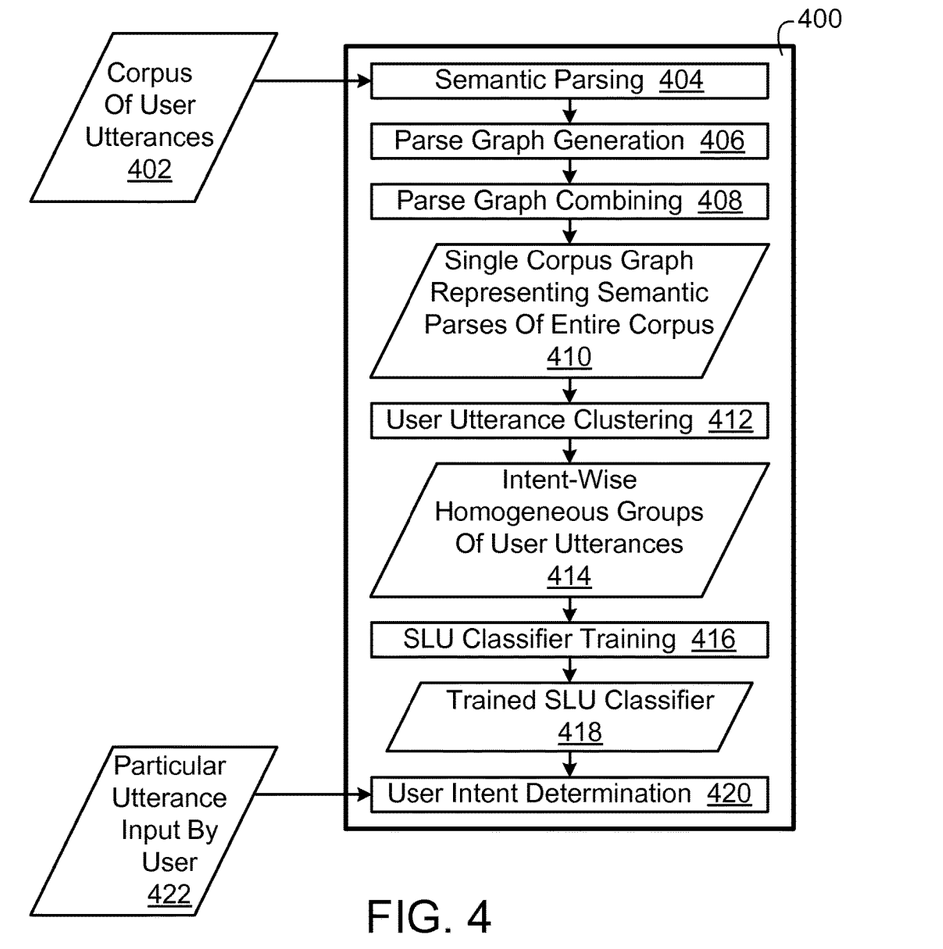
FIG. 4 is a diagram illustrating an exemplary implementation, in simplified form, of a system framework for training an SLU classifier, and for using this trained classifier to determine the intent of a user from a particular utterance that is input by the user.

FIG. 4 illustrates an exemplary implementation, in simplified form, of a system framework for training an SLU classifier, and for using this trained classifier to determine the intent of a user from a particular utterance that is input by the user. As exemplified in FIG. 4, the system framework 400 includes a semantic parsing program module 404, a parse graph generation program module 406, a parse graph combining program module 408, a user utterance clustering program module 412, an SLU classifier training program module 416, and a user intent determination program module 420. Each of these program modules is realized on a computing device such as that described in more detail in the Exemplary Operating Environments section which follows.

Referring again to FIG. 4, the semantic parsing program module 404 receives a corpus of user utterances 402 and for each of the user utterances in the corpus 402, semantically parses the user utterance. The parse graph generation program module 406 represents the result of the semantic parsing of each of the user utterances in the corpus 402 as a rooted semantic parse graph. The parse graph combining program module 408 combines the parse graphs representing all of the user utterances in the corpus 402 into the aforementioned single corpus graph that represents the semantic parses of the entire corpus 410. The user utterance clustering program module 412 uses the single corpus graph 410 that is produced by the parse graph combining program module 408 to cluster the user utterances in the corpus 402 into intent-wise homogeneous groups of user utterances 414, where this clustering can be performed using either the aforementioned frequency-based corpus graph pruning method, or the aforementioned entropy-based corpus graph pruning method, or the aforementioned similarity-based corpus graph pruning method, or any combination of these methods.

Referring again to FIG. 4, the SLU classifier training program module 416 uses the intent-wise homogeneous groups of user utterances 414 that are found by the user utterance clustering program module 412 to train the aforementioned SLU classifier. The user intent determination program module 420 uses the trained SLU classifier 418 that is output by the SLU classifier training program module 416 to determine the intent of a user from a particular utterance that is input by the user 422.

3.0 Other Implementations

While the clustering technique has been described by specific reference to implementations thereof, it is understood that variations and modifications thereof can be made without departing from the true spirit and scope of the clustering technique. By way of example but not limitation, the intent-wise homogeneous clusters of user utterances that are generated by the clustering technique implementations described herein can be used for other purposes besides the aforementioned training of an SLU classifier. For example, these clusters of user utterances can be used by a given spoken dialog system or application for utterance analytics purposes. The clusters of user utterances can also be used to extend the coverage of spoken dialog applications to new uncovered domains and user intents as described heretofore.

Additionally, rather than representing the result of the semantic parsing of each of the user utterances in the corpus as a rooted semantic parse graph and then combining the parse graphs representing all of the user utterances in the corpus into a single corpus graph as described heretofore, an alternate implementation of the clustering technique implementations described herein is also possible where the result of the semantic parsing of each of the user utterances in the corpus is represented in a hierarchical structure and the hierarchical structures representing all of the user utterances in the corpus are then combined into a single hierarchical structure that represents the semantic parses of the entire corpus, where this single hierarchical structure includes a root node that is common to the hierarchical structure representing each of the user utterances in the corpus. In this alternate implementation, the user utterances in the corpus are clustered into intent-wise homogeneous groups of user utterances by finding substructures in the single hierarchical structure that represent different groups of user utterances, where each of these different groups has a similar user intent, and each of the substructures is more specific than the root node alone and more general than the full semantic parses of the individual user utterances. It will be appreciated that a rooted semantic parse graph is just one example of a hierarchical structure that can be used to represent the result of the semantic parsing of each of the user utterances in the corpus; other types of hierarchical structures may also be used.

It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 5:
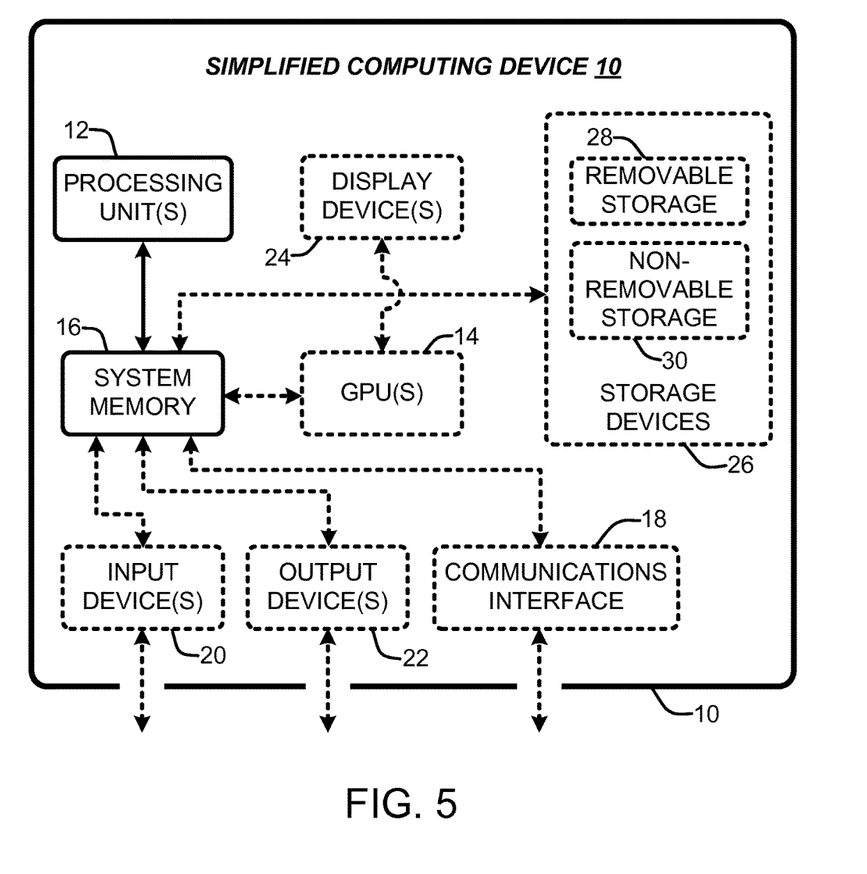
FIG. 5 is a diagram illustrating a simplified example of a general-purpose computer system on which various implementations and elements of the utterance intent clustering technique, as described herein, may be realized.

The clustering technique implementations described herein are operational within numerous types of general purpose or special purpose computing system environments or configurations. FIG. 5 illustrates a simplified example of a general-purpose computer system on which various implementations and elements of the clustering technique, as described herein, may be implemented. It is noted that any boxes that are represented by broken or dashed lines in the simplified computing device 10 shown in FIG. 5 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the clustering technique implementations described herein, the device should have a sufficient computational capability and system memory to enable basic computational operations. In particular, the computational capability of the simplified computing device 10 shown in FIG. 5 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the clustering technique implementations described herein, including input, output, control, feedback, and response to one or more users or other devices or systems associated with the clustering technique implementations, are enabled by a variety of Natural User Interface (NUI) scenarios. The NUI techniques and scenarios enabled by the clustering technique implementations include, but are not limited to, interface technologies that allow one or more users user to interact with the clustering technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the clustering technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the clustering technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 5 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various clustering technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The clustering technique implementations described herein may be further described in the general context of computer-executable instructions, such as program modules, being executed by a computing device. Generally, program modules include routines, programs, objects, components, data structures, and the like, that perform particular tasks or implement particular abstract data types. The clustering technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

5.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for training an SLU classifier. This system includes one or more computing devices which are in communication with each other via a computer network whenever there is a plurality of computing devices. The system also includes a computer program having program modules executable by the one or more computing devices. The one or more computing devices are directed by the program modules of the computer program to receive a corpus of user utterances, for each of the user utterances in the corpus, semantically parse the user utterance, and represent the result of this semantic parsing as a rooted semantic parse graph, combine the parse graphs representing all of the user utterances in the corpus into a single corpus graph that represents the semantic parses of the entire corpus and includes a root node that is common to the parse graph representing each of the user utterances in the corpus, cluster the user utterances in the corpus into intent-wise homogeneous groups of user utterances, this clustering including finding subgraphs in the corpus graph that represent different groups of user utterances, each of these different groups having a similar user intent, each of the subgraphs being more specific than the root node alone and more general than the full semantic parses of the individual user utterances, use the intent-wise homogeneous groups of user utterances to train the SLU classifier, and output the trained SLU classifier.

In one implementation of the just-described system, the semantic parsing of each of the user utterances in the corpus is performed using an Abstract Meaning Representation semantic parser that considers the lexical semantic structure of each of the user utterances. In another implementation the semantic parsing of each of the user utterances in the corpus is performed using a Proposition Bank semantic parser. In yet another implementation the semantic parsing of each of the user utterances in the corpus is performed using one of: a dependency parser; or a FrameNet semantic parser; or the dependency parser combined with the FrameNet semantic parser.

In one implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the frequency of occurrence of each of the child nodes in the corpus graph, identifying the child nodes in the corpus graph whose frequency of occurrence is less than a prescribed threshold, and pruning the corpus graph by eliminating the identified child nodes and the edges connected thereto from the corpus graph.

In another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the entropy at each of the child nodes in the corpus graph, identifying the child nodes in the corpus graph whose entropy is greater than a prescribed threshold, and pruning the corpus graph by eliminating the identified child nodes and the edges connected thereto from the corpus graph. In one version of this particular implementation this pruning is performed via a breadth-first traversal of the corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the frequency of occurrence of each of the child nodes in the corpus graph, initially identifying the child nodes in the corpus graph whose frequency of occurrence is less than a prescribed frequency threshold, initially pruning the corpus graph by eliminating the initially identified child nodes and the edges connected thereto from the corpus graph, computing the entropy at each of the child nodes in the initially pruned corpus graph, subsequently identifying the child nodes in the initially pruned corpus graph whose entropy is greater than a prescribed entropy threshold, and subsequently pruning the initially pruned corpus graph by eliminating the subsequently identified child nodes and the edges connected thereto from the initially pruned corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the entropy at each of the child nodes in the corpus graph, initially identifying the child nodes in the corpus graph whose entropy is greater than a prescribed entropy threshold, initially pruning the corpus graph by eliminating the initially identified child nodes and the edges connected thereto from the corpus graph, computing the frequency of occurrence of each of the child nodes in the initially pruned corpus graph, subsequently identifying the child nodes in the initially pruned corpus graph whose frequency of occurrence is less than a prescribed frequency threshold, and subsequently pruning the initially pruned corpus graph by eliminating the subsequently identified child nodes and the edges connected thereto from the initially pruned corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the semantic similarity of each of the child nodes in the corpus graph to all of the other child nodes in the corpus graph, identifying the child nodes in the corpus graph whose semantic similarity is less than a prescribed threshold, and pruning the corpus graph by eliminating the identified child nodes and the edges connected thereto from the corpus graph.

In one implementation, the SLU classifier training is performed using a machine learning method that includes one of: a logistic regression method; or a decision trees method; or a support vector machine method. In another implementation, the SLU classifier includes one of: a support vector machine; or an artificial neural network; or a Bayesian statistical classifier.

In another implementation, an utterance intent determination system includes: one or more computing devices which are in communication with each other via a computer network whenever there is a plurality of computing devices; and a computer program having program modules executable by the one or more computing devices, where the one or more computing devices are directed by the program modules of the computer program to, receive a corpus of user utterances, for each of the user utterances in the corpus, semantically parse the user utterance, and represent the result of this semantic parsing as a rooted semantic parse graph, combine the parse graphs representing all of the user utterances in the corpus into a single corpus graph that represents the semantic parses of the entire corpus and includes a root node that is common to the parse graph representing each of the user utterances in the corpus, cluster the user utterances in the corpus into intent-wise homogeneous groups of user utterances, this clustering including finding subgraphs in the corpus graph that represent different groups of user utterances, each of these different groups having a similar user intent, each of the subgraphs being more specific than the root node alone and more general than the full semantic parses of the individual user utterances, use the intent-wise homogeneous groups of user utterances to train an SLU classifier, receive a particular utterance input by a user, and use the trained SLU classifier to determine the intent of the user from this particular utterance.

In one implementation of the just-described utterance intent determination system, the particular utterance input by the user is an uncovered, out-of-domain user utterance. In another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the frequency of occurrence of each of the child nodes in the corpus graph, identifying the child nodes in the corpus graph whose frequency of occurrence is less than a prescribed threshold, and pruning the corpus graph by eliminating the identified child nodes and the edges connected thereto from the corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the entropy at each of the child nodes in the corpus graph, identifying the child nodes in the corpus graph whose entropy is greater than a prescribed threshold, and pruning the corpus graph by eliminating the identified child nodes and the edges connected thereto from the corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the frequency of occurrence of each of the child nodes in the corpus graph, initially identifying the child nodes in the corpus graph whose frequency of occurrence is less than a prescribed frequency threshold, initially pruning the corpus graph by eliminating the initially identified child nodes and the edges connected thereto from the corpus graph, computing the entropy at each of the child nodes in the initially pruned corpus graph, subsequently identifying the child nodes in the initially pruned corpus graph whose entropy is greater than a prescribed entropy threshold, and subsequently pruning the initially pruned corpus graph by eliminating the subsequently identified child nodes and the edges connected thereto from the initially pruned corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the entropy at each of the child nodes in the corpus graph, initially identifying the child nodes in the corpus graph whose entropy is greater than a prescribed entropy threshold, initially pruning the corpus graph by eliminating the initially identified child nodes and the edges connected thereto from the corpus graph, computing the frequency of occurrence of each of the child nodes in the initially pruned corpus graph, subsequently identifying the child nodes in the initially pruned corpus graph whose frequency of occurrence is less than a prescribed frequency threshold, and subsequently pruning the initially pruned corpus graph by eliminating the subsequently identified child nodes and the edges connected thereto from the initially pruned corpus graph.

In yet another implementation, the corpus graph further includes a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances includes program modules for: computing the semantic similarity of each of the child nodes in the corpus graph to all of the other child nodes in the corpus graph, identifying the child nodes in the corpus graph whose semantic similarity is less than a prescribed threshold, and pruning the corpus graph by eliminating the identified child nodes and the edges connected thereto from the corpus graph.

In another implementation, a computer-implemented process for training an SLU classifier includes the actions of: using one or more computing devices to perform the following process actions, the computing devices being in communication with each other via a computer network whenever a plurality of computing devices is used: receiving a corpus of user utterances, for each of the user utterances in the corpus, semantically parsing the user utterance, and representing the result of this semantic parsing as a rooted semantic parse graph, combining the parse graphs representing all of the user utterances in the corpus into a single corpus graph that represents the semantic parses of the entire corpus and includes a root node that is common to the parse graph representing each of the user utterances in the corpus, clustering the user utterances in the corpus into intent-wise homogeneous groups of user utterances, this clustering including finding subgraphs in the corpus graph that represent different groups of user utterances, each of these different groups having a similar user intent, each of the subgraphs being more specific than the root node alone and more general than the full semantic parses of the individual user utterances, using the intent-wise homogeneous groups of user utterances to train the SLU classifier, and outputting the trained SLU classifier.

In another implementation, a computer-implemented process for training an SLU classifier includes the actions of: using one or more computing devices to perform the following process actions, the computing devices being in communication with each other via a computer network whenever a plurality of computing devices is used: receiving a corpus of user utterances, for each of the user utterances in the corpus, semantically parsing the user utterance, and representing the result of this semantic parsing in a hierarchical structure, combining the hierarchical structures representing all of the user utterances in the corpus into a single hierarchical structure that represents the semantic parses of the entire corpus and includes a root node that is common to the hierarchical structure representing each of the user utterances in the corpus, clustering the user utterances in the corpus into intent-wise homogeneous groups of user utterances, this clustering including finding substructures in the single hierarchical structure that represent different groups of user utterances, each of these different groups having a similar user intent, each of the substructures being more specific than the root node alone and more general than the full semantic parses of the individual user utterances, using the intent-wise homogeneous groups of user utterances to train the SLU classifier, and outputting the trained SLU classifier.

Wherefore, what is claimed is:

1. A system for training a spoken language understanding (SLU) classifier, comprising:
one or more computing devices, said computing devices being in communication with each other via a computer network whenever there is a plurality of computing devices; and
a computer program having program modules executable by the one or more computing devices, the one or more computing devices being directed by the program modules of the computer program to,
receive a corpus of user utterances,
for each of the user utterances in the corpus,
semantically parse the user utterance, and
represent the result of said semantic parsing as a rooted semantic parse graph,
combine the parse graphs representing all of the user utterances in the corpus into a single corpus graph that represents the semantic parses of the entire corpus and comprises a root node that is common to the parse graph representing each of the user utterances in the corpus,
cluster the user utterances in the corpus into intent-wise homogeneous groups of user utterances, said clustering comprising finding subgraphs in the corpus graph that represent different groups of user utterances, each of said different groups having a similar user intent, each of the subgraphs being more specific than the root node alone and more general than the full semantic parses of the individual user utterances,
use the intent-wise homogeneous groups of user utterances to train the SLU classifier, and
output the trained SLU classifier.

2. The system of claim 1, wherein the semantic parsing of each of the user utterances in the corpus is performed using an Abstract Meaning Representation semantic parser that considers the lexical semantic structure of each of the user utterances.

3. The system of claim 1, wherein the semantic parsing of each of the user utterances in the corpus is performed using a Proposition Bank semantic parser.

4. The system of claim 1, wherein the semantic parsing of each of the user utterances in the corpus is performed using one of:
a dependency parser; or
a FrameNet semantic parser; or
the dependency parser combined with the FrameNet semantic parser.

5. The system of claim 1, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
computing the frequency of occurrence of each of the child nodes in the corpus graph,
identifying the child nodes in the corpus graph whose frequency of occurrence is less than a prescribed threshold, and
pruning the corpus graph by eliminating the identified child nodes and the edges connected thereto from the corpus graph.

6. The system of claim 1, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
computing the entropy at each of the child nodes in the corpus graph,
identifying the child nodes in the corpus graph whose entropy is greater than a prescribed threshold, and
pruning the corpus graph by eliminating the identified child nodes and the edges connected thereto from the corpus graph.

7. The system of claim 6, wherein said pruning is performed via a breadth-first traversal of the corpus graph.

8. The system of claim 1, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
computing the frequency of occurrence of each of the child nodes in the corpus graph,
initially identifying the child nodes in the corpus graph whose frequency of occurrence is less than a prescribed frequency threshold,
initially pruning the corpus graph by eliminating the initially identified child nodes and the edges connected thereto from the corpus graph,
computing the entropy at each of the child nodes in the initially pruned corpus graph,
subsequently identifying the child nodes in the initially pruned corpus graph whose entropy is greater than a prescribed entropy threshold, and
subsequently pruning the initially pruned corpus graph by eliminating the subsequently identified child nodes and the edges connected thereto from the initially pruned corpus graph.

9. The system of claim 1, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
computing the entropy at each of the child nodes in the corpus graph,
initially identifying the child nodes in the corpus graph whose entropy is greater than a prescribed entropy threshold,
initially pruning the corpus graph by eliminating the initially identified child nodes and the edges connected thereto from the corpus graph,
computing the frequency of occurrence of each of the child nodes in the initially pruned corpus graph,
subsequently identifying the child nodes in the initially pruned corpus graph whose frequency of occurrence is less than a prescribed frequency threshold, and
subsequently pruning the initially pruned corpus graph by eliminating the subsequently identified child nodes and the edges connected thereto from the initially pruned corpus graph.

10. The system of claim 1, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
  computing the semantic similarity of each of the child nodes in the corpus graph to all of the other child nodes in the corpus graph,
  identifying the child nodes in the corpus graph whose semantic similarity is less than a prescribed threshold, and
  pruning the corpus graph by eliminating the identified child nodes and the edges connected thereto from the corpus graph.

11. The system of claim 1, wherein said SLU classifier training is performed using a machine learning method comprising one of:
  a logistic regression method; or
  a decision trees method; or
  a support vector machine method.

12. The system of claim 1, wherein the SLU classifier comprises one of:
  a support vector machine; or
  an artificial neural network; or
  a Bayesian statistical classifier.

13. An utterance intent determination system, comprising:
  one or more computing devices, said computing devices being in communication with each other via a computer network whenever there is a plurality of computing devices; and
  a computer program having program modules executable by the one or more computing devices, the one or more computing devices being directed by the program modules of the computer program to,
    receive a corpus of user utterances,
    for each of the user utterances in the corpus,
      semantically parse the user utterance, and
      represent the result of said semantic parsing as a rooted semantic parse graph,
    combine the parse graphs representing all of the user utterances in the corpus into a single corpus graph that represents the semantic parses of the entire corpus and comprises a root node that is common to the parse graph representing each of the user utterances in the corpus,
    cluster the user utterances in the corpus into intent-wise homogeneous groups of user utterances, said clustering comprising finding subgraphs in the corpus graph that represent different groups of user utterances, each of said different groups having a similar user intent, each of the subgraphs being more specific than the root node alone and more general than the full semantic parses of the individual user utterances,
    use the intent-wise homogeneous groups of user utterances to train a spoken language understanding (SLU) classifier,
    receive a particular utterance input by a user, and
    use the trained SLU classifier to determine the intent of the user from said particular utterance.

14. The system of claim 13, wherein said particular utterance is an uncovered, out-of-domain user utterance.

15. The system of claim 13, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
  computing the frequency of occurrence of each of the child nodes in the corpus graph,
  identifying the child nodes in the corpus graph whose frequency of occurrence is less than a prescribed threshold, and
  pruning the corpus graph by eliminating the identified child nodes and the edges connected thereto from the corpus graph.

16. The system of claim 13, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
  computing the entropy at each of the child nodes in the corpus graph,
  identifying the child nodes in the corpus graph whose entropy is greater than a prescribed threshold, and
  pruning the corpus graph by eliminating the identified child nodes and the edges connected thereto from the corpus graph.

17. The system of claim 13, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
  computing the frequency of occurrence of each of the child nodes in the corpus graph,
  initially identifying the child nodes in the corpus graph whose frequency of occurrence is less than a prescribed frequency threshold,
  initially pruning the corpus graph by eliminating the initially identified child nodes and the edges connected thereto from the corpus graph,
  computing the entropy at each of the child nodes in the initially pruned corpus graph,
  subsequently identifying the child nodes in the initially pruned corpus graph whose entropy is greater than a prescribed entropy threshold, and
  subsequently pruning the initially pruned corpus graph by eliminating the subsequently identified child nodes and the edges connected thereto from the initially pruned corpus graph.

18. The system of claim 13, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:
  computing the entropy at each of the child nodes in the corpus graph,
  initially identifying the child nodes in the corpus graph whose entropy is greater than a prescribed entropy threshold, initially pruning the corpus graph by eliminating the initially identified child nodes and the edges connected thereto from the corpus graph, computing the frequency of occurrence of each of the child nodes in the initially pruned corpus graph, subsequently identifying the child nodes in the initially pruned corpus graph whose frequency of occurrence is less than a prescribed frequency threshold, and subsequently pruning the initially pruned corpus graph by eliminating the subsequently identified child nodes and the edges connected thereto from the initially pruned corpus graph.

19. The system of claim 13, wherein the corpus graph further comprises a plurality of child nodes and a plurality of edges each of which either connects the root node to one of the child nodes or connects one of the child nodes to another one of the child nodes, and the program module for clustering the user utterances in the corpus into intent-wise homogeneous groups of user utterances comprises program modules for:

computing the semantic similarity of each of the child nodes in the corpus graph to all of the other child nodes in the corpus graph, identifying the child nodes in the corpus graph whose semantic similarity is less than a prescribed threshold, and pruning the corpus graph by eliminating the identified child nodes and the edges connected thereto from the corpus graph.

20. A computer-implemented process for training a spoken language understanding (SLU) classifier, comprising the actions of:

using one or more computing devices to perform the following process actions, the computing devices being in communication with each other via a computer network whenever a plurality of computing devices is used:

receiving a corpus of user utterances, for each of the user utterances in the corpus, semantically parsing the user utterance, and representing the result of said semantic parsing in a hierarchical structure, combining the hierarchical structures representing all of the user utterances in the corpus into a single hierarchical structure that represents the semantic parses of the entire corpus and comprises a root node that is common to the hierarchical structure representing each of the user utterances in the corpus, clustering the user utterances in the corpus into intent-wise homogeneous groups of user utterances, said clustering comprising finding substructures in the single hierarchical structure that represent different groups of user utterances, each of said different groups having a similar user intent, each of the substructures being more specific than the root node alone and more general than the full semantic parses of the individual user utterances, using the intent-wise homogeneous groups of user utterances to train the SLU classifier, and outputting the trained SLU classifier.

* * * * *